Patented Aug. 19, 1924.

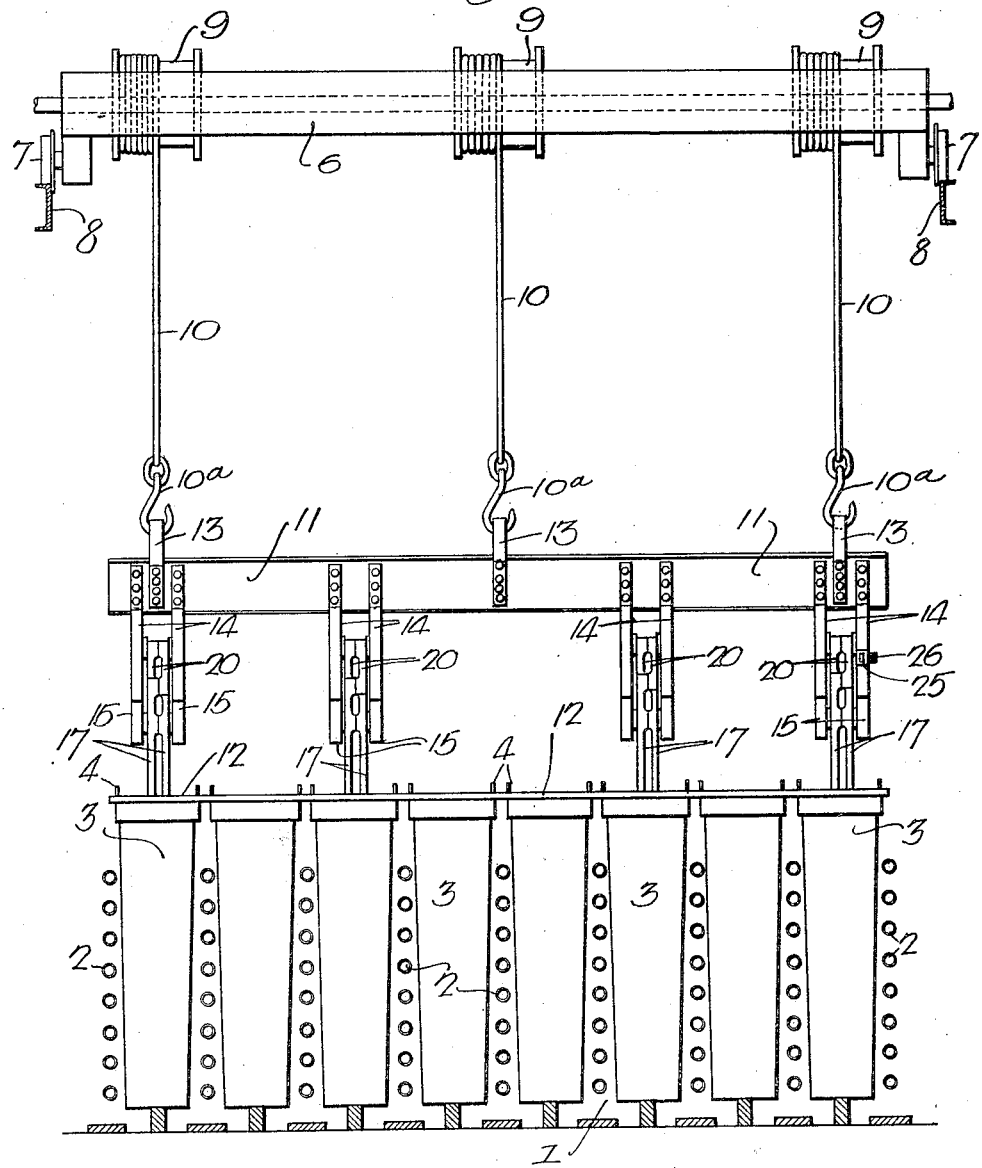

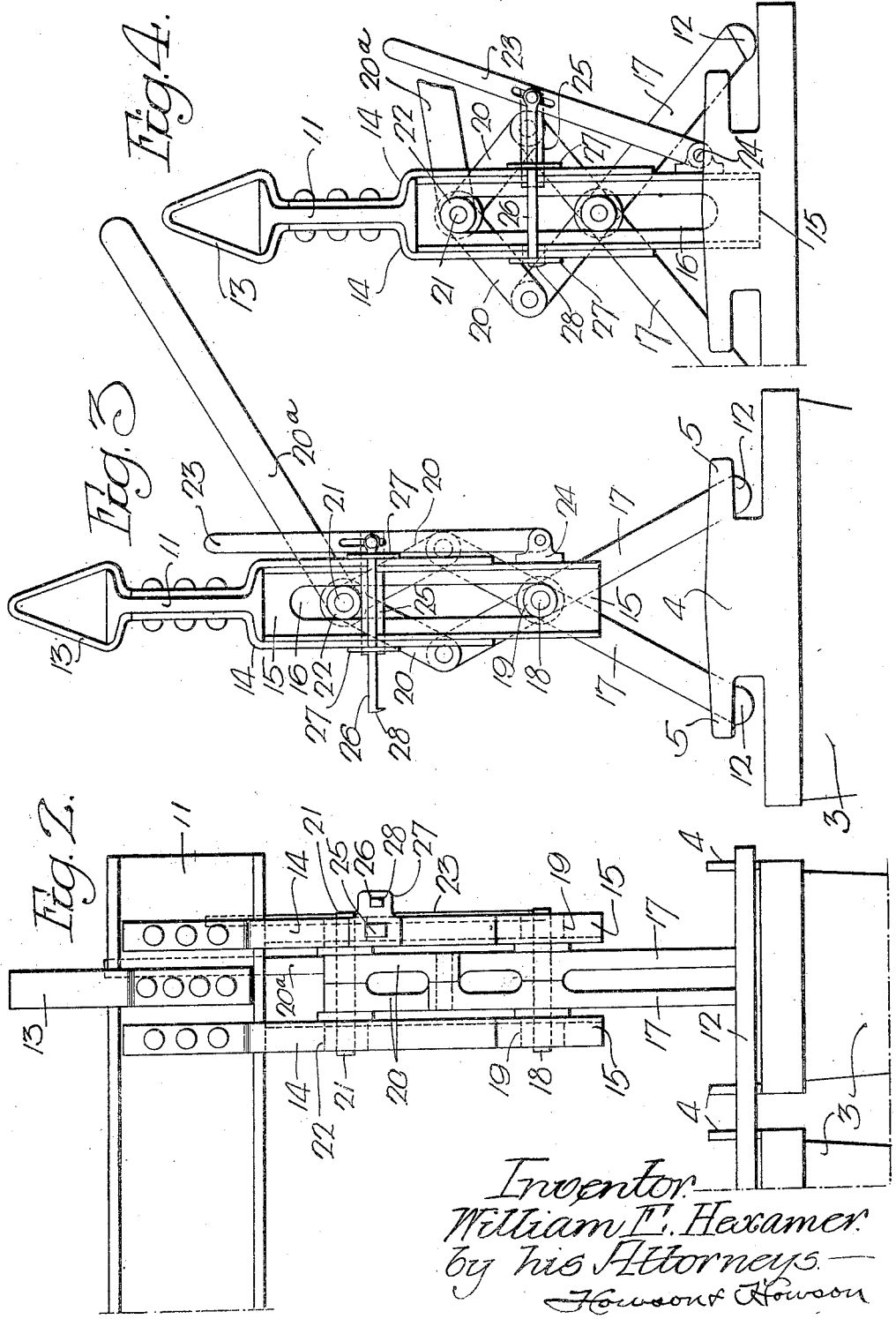

1,505,890

UNITED STATES PATENT OFFICE.

WILLIAM E. HEXAMER, OF PHILADELPHIA, PENNSYLVANIA.

LIFTING DEVICE.

Application filed February 3, 1922. Serial No. 533,920.

*To all whom it may concern:*

Be it known that I, WILLIAM E. HEXAMER, a citizen of the United States, residing in Philadelphia, Pennsylvania, have invented Lifting Devices, of which the following is a specification.

One object of my invention is to provide a relatively simple, substantial and conveniently operative mechanism whereby a number of containers such as the ice cans, or blocks of ice with hooks or other devices frozen into them, of a refrigerating or ice making system may be simultaneously raised and transported, the apparatus being particularly devised to reduce the time and labor necessary in removing the cans or blocks of ice from the freezing tank, dumping the cans and returning them to said tank.

Another object of the invention is to provide a novel device for simultaneously engaging the hooks or projecting elements of a series of objects arranged in a row to permit of these being quickly and conveniently moved;—the invention further contemplating novel means for preventing the accidental disengagement of the mechanism from the cans, blocks of ice, or other objects engaged, together with means whereby the various parts may be guided when desired.

Another object of my invention is to provide a device of the general type noted which shall be of such a nature as to automatically engage or disengage the hooks or other attaching elements of a series of cans or blocks of ice when it is suitably raised or lowered as the case may be, the arrangement of parts being simple, substantial and reliable under conditions of use.

These objects and other advantageous ends I attain as hereinafter set forth, reference being had to the accompanying drawings, in which, Fig. 1 is a side elevation to some extent diagrammatic, illustrating the apparatus constituting my invention;

Fig. 2 is a fragmentary elevation similar to Fig. 1 but on a larger scale;

Fig. 3 is an end elevation of the apparatus shown in Fig. 2, the lifting mechanism being shown as engaged with the hooks of a can; and Fig. 4 is an elevation similar to Fig. 3 but showing the parts in their disengaged positions.

In the above drawings 1 represents, to some extent diagrammatically, a tank containing a series of coils 2 in which refrigerant such as ammonia is expanded to cool a body of brine or other suitable heat-transferring liquid within said tank. Water or other material to be frozen is contained within the cans 3, of any desired or suitable form and which may be either stationary or removable, immersed in the liquid within said tank, and, in accordance with my invention, made with hook-shaped flanges 4 on two of their opposite top edges. While these projections or hooks may have any desired or suitable form, I preferably make each of them double, i. e., with a central upwardly projecting portion and two overhung oppositely extending parts 5, so that each flange in effect constitutes a double hook.

For the purpose of simultaneously engaging and transporting any desired number of the cans 3 or other objects having hooks or equivalent structures arranged in a row, I provide the elevating mechanism shown which consists of a crane structure 6 preferably having supporting wheels or rollers 7 operative on elevated tracks 8 over the tank 1 and carrying a suitable number of mechanically actuated hoisting devices 9 driven by electric or other power as desired or found most convenient. Each of said devices is provided with a cable and hooks on the cables of the several devices engage eyes or strap members 13 on a relatively rigid beam 11 from which depends a series of coupling devices each connected to a pair of bars 12 extending parallel with the line of cans 3 and designed to respectively enter the hooks formed by the flanges on said cans or hooks frozen into bodies of ice.

Each of the coupling devices consists of a hanger including a pair of elongated and substantially parallel members 14 connected at their upper ends to the beam 11 and depending therefrom and supporting a plate 15 formed with a vertically extending slot 16. Mounted between each pair of members 14 is a pair of levers 17—17 connected at their lower ends to the bars 12 respectively, and themselves pivotally connected by a pin 18 whose ends are preferably equipped with rollers or collars 19 slidably guided in the slots 16 of the hanger. To the upper end of each lever 17 is pivotally connected a link 20 and the upper ends of these two links are pivotally connected by a second pin 21 having collars or rollers 22 on its ends also slidably guided in the slots 16. One of the links 20 has an extension 20ᵃ beyond its pivot pin 21 whereby it and consequently the levers 17 may be turned on their pivots or fulcrums to move the bars 12 toward or from each other at will.

With the above described arrangement of parts the coupling devices are hung from the beam 11 in such numbers and are so spaced as to most satisfactorily distribute the load on the bars 12, the arrangement being for example that shown in Fig. 2. Obviously the distribution and number of coupling devices used may be varied to suit various conditions without departing from my invention.

With the above described arrangement of parts it is obvious that under the action of gravity each set of levers 17—17 with their links 20—20 tends to assume the position in the hangers illustrated in Fig. 3, and if it be desired to engage and raise the cans 3 of one of the rows of cans in the tank 1, the operating mechanism for the hoists 9 is so actuated as to lower the beam 11 with its attached devices. The bars 12 are thereupon brought into engagement with the tops of the hooked flanges of the row of cans, after which the continued lowering of the beam 11 and the hangers causes the pin 21 of each coupling device to engage the upper end of the slot 16 with the result that the downward pressure on said pin, through the links 20, moves the levers 17 on their pivot pin 18 in such manner that the bars 12 move apart and ultimately separate far enough to drop off of the hooks onto the adjacent top edges of the cans.

If now the hoist 9 of the crane be so operated as to raise the beam 11, the various hangers move upwardly, first permitting and then compelling the bars 12 to move toward each other, until when the ends of each pin 18 engage the bottom of the slots 16 in its hanger, the bars 12 are entered under the portions 5 of the hooks and are thereafter moved upwardly so as to simultaneously raise all of the cans of the series. These may now be moved to any desired point and treated as required for the purpose of discharging blocks of ice which may be formed in them, after which the crane is operated to properly position said cans over the tank 1 and simultaneously lower them into the liquid therein. After the cans have come to rest in the tank, continued lowering of the beam 11 causes the ends of the pivot pins 20 of each coupling device to engage the upper ends of the slots 16, whereupon the levers 17 of each pin are forcibly turned on their pivot pin 18, thus swinging the bars 12 out of engagement with the hooks of the cans.

By means of the extension 20ᵃ the levers 17 of any one of the coupling devices may be held in the positions shown in Fig. 4 with the bars 12 widely separated so that the hoists 9 may thereupon be operated to raise the beam 11 and the coupling devices in order to permit the apparatus being used on another set of cans.

If desired I may provide locking means whereby accidental or unintentional disengagement of the bars 12 from the hooks of the cans will be effectually prevented and for this purpose mount on each of the hangers a hand lever 23, preferably pivoting it to a suitable bracket 24 on the lower portion of one side thereof. To the upper part of this lever I connect a bolt 25 slidable transversely through the members 14 in such position as will permit it to be moved into the slot 16 in said hanger, when said hand lever is swung into the position shown in Fig. 3 or out of said slot when it is moved into the position shown in Fig. 4.

When lying substantially parallel with the hanger as in Fig. 3, the bolt 25 is engaged by the end of the pin 21, thus limiting its downward movement, while when the bolt has been withdrawn as shown in Fig. 4, the raising of the beam 11 with the coupling devices causes the hanger to move upwardly relatively to the pin 21 to such an extent that said bolt may be moved into the slot 16 and thus prevent such subsequent upward movement of said pin as would be necessary to allow the bars 12 to approach each other into operative engagement with the hooks 5 of the cans. Said bars are thus locked in their open or separated positions so that the device may be moved away from one row of cans into position to cooperate with the hooks of a second row, whereupon the bolt may be withdrawn by suitable operation of the lever 23.

In order to prevent the said lever from swinging too far out so as to completely disengage the bolt 25 from its guiding passages in the hanger, I provide a rod 26 operative through a pair of plates 27 on the adjacent hanger and having one end connected to the lever 23 while its second end has a head 28 which limits movement of the lever as desired.

Without departing from my invention the mechanism described may be utilized for transporting blocks or other bodies of ice having hooks or equivalent structures frozen therein, for which purpose said hooks would be arranged in lines and engaged by the bars 12 as above described when the apparatus is employed to operate on hooks mounted on cans.

I claim:

1. The combination of a series of containers arranged in a row; a crane; at least one bar supported from the crane at a plurality of points; and hooks on the containers in position to be detachably engaged by said bar.

2. The combination of a series of containers having hooks respectively; hoisting means; with a pair of bars carried by said hoisting means and movable into and out of positions to simultaneously engage the hooks of the containers when it is desired to raise the same.

3. The combination of a crane; a pair of substantially parallel members; and mechanism actuated by the crane for causing said members to operatively engage a plurality of aligned hooks on objects to be transported.

4. The combination of a crane; a pair of substantially parallel hook-engaging members; means carried by the crane for causing said members to move into lifting engagement with a plurality of hooks when the crane is operated to raise the same.

5. The combination of a frame; means for bodily moving the same at will; a pair of pivotally connected levers carried by the frame; with parallel bars carried respectively by the levers and free to move toward each other into lifting engagement with a container when said frame is raised.

6. The combination of a frame having a guideway thereon; means for bodily moving said frame; a pivot structure movable in said guideway of the frame; two levers connected by said pivot structure and angularly adjustable thereon; with parallel lifting bars carried by said levers.

7. The combination of a frame having a guideway thereon; two pivot structures operative in said guideway; a pair of levers operatively connected by one of said pivot structures; a pair of links operatively connected by the other pivot structure and respectively pivoted to the levers; with substantially parallel bars carried by the levers for operatively engaging the container when the frame is moved.

8. The combination of a frame having a guideway thereon; two pivot structures operative in said guideway; a pair of levers operatively connected by one of said pivot structures; a pair of links operatively connected by the other pivot structure and respectively pivoted to the levers; with a pair of horizontally extending bars carried respectively by said levers.

9. The combination of a crane; a plurality of frames carried thereby; a plurality of pairs of pivotally connected members carried by said frames respectively; two bars respectively connected to the levers of said pairs and free to move toward and from each other when the levers are turned on their pivots.

10. The combination of a crane; a pair of substantially parallel lifting bars; with a plurality of devices suspending said bars from the crane including means for causing them to automatically approach each other when they are raised and to separate when they are lowered.

11. The combination of a crane; a pair of substantially parallel lifting bars; a plurality of devices suspending said bars from the crane including means for causing said bars to automatically approach each other when they are raised and to separate when they are lowered; with means for locking said bars in predetermined positions.

WILLIAM E. HEXAMER.